Sept. 8, 1925.  W. G. ALLAN  1,552,812
ELECTROLYTIC CELL
Original Filed Oct. 5, 1920   4 Sheets-Sheet 1
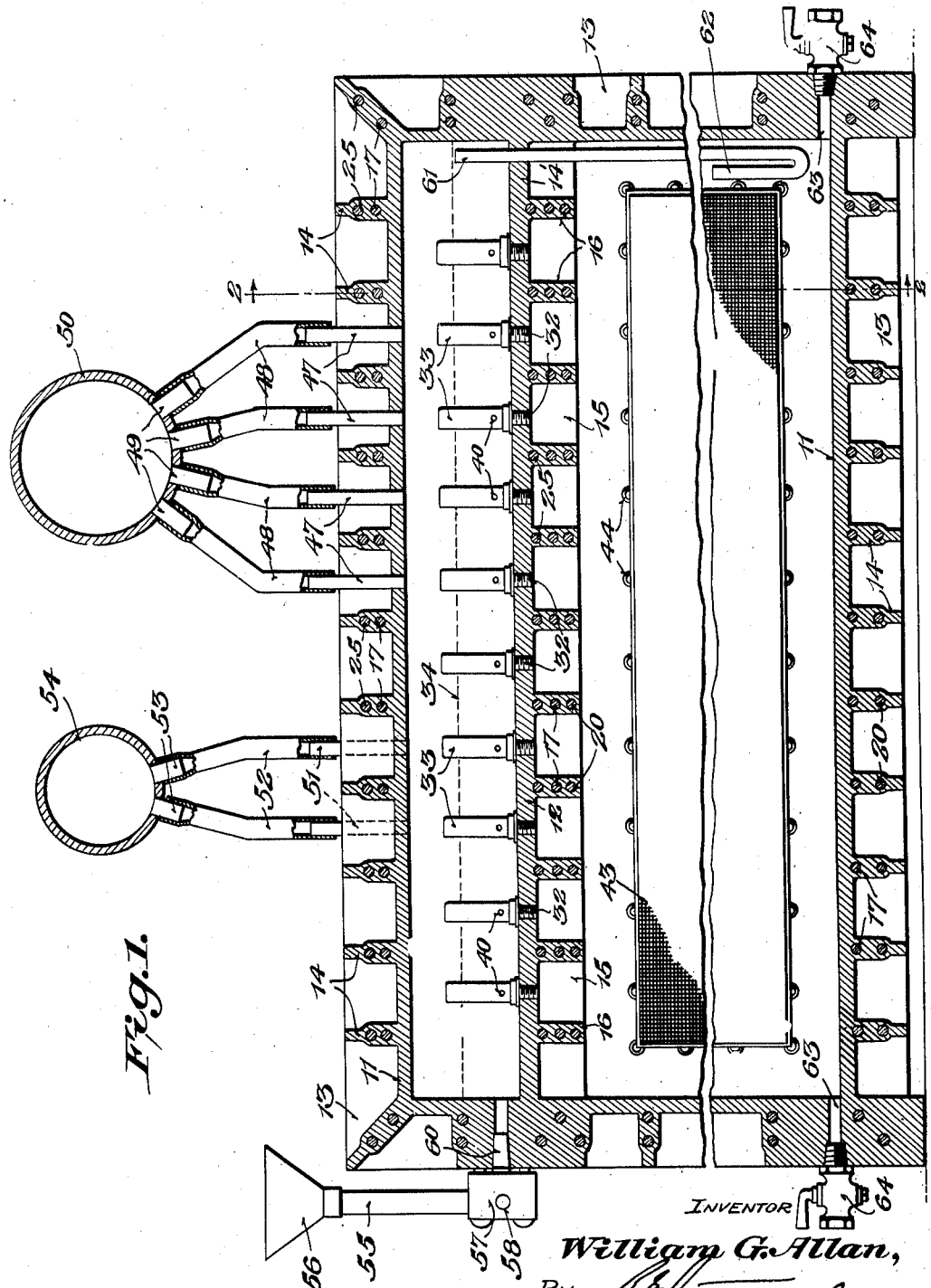

Sept 8, 1925. 1,552,812
W. G. ALLAN
ELECTROLYTIC CELL
Original Filed Oct. 5, 1920 4 Sheets-Sheet 2
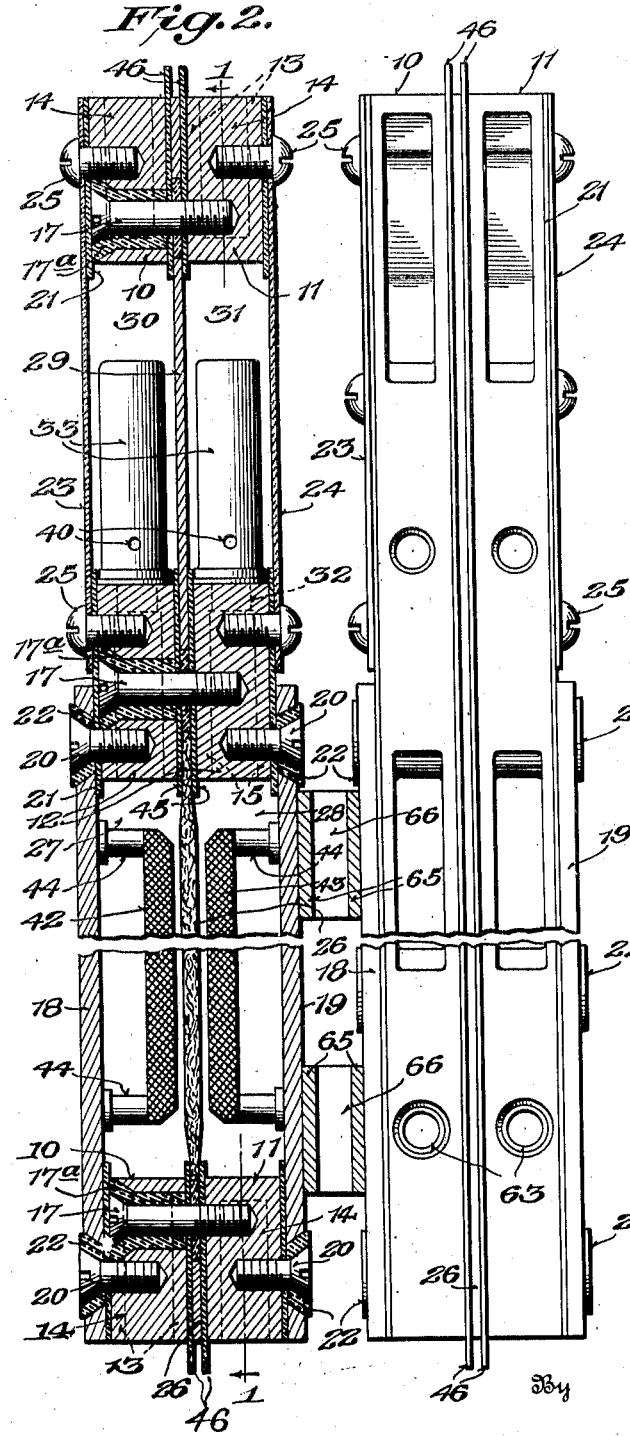
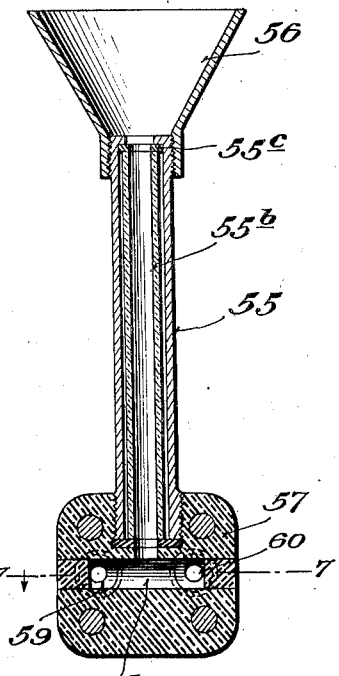
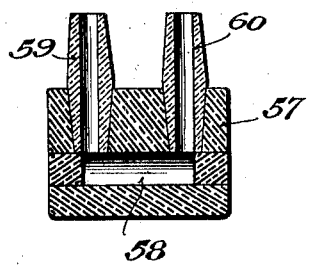
Inventor
William G. Allan,
his Attorney.

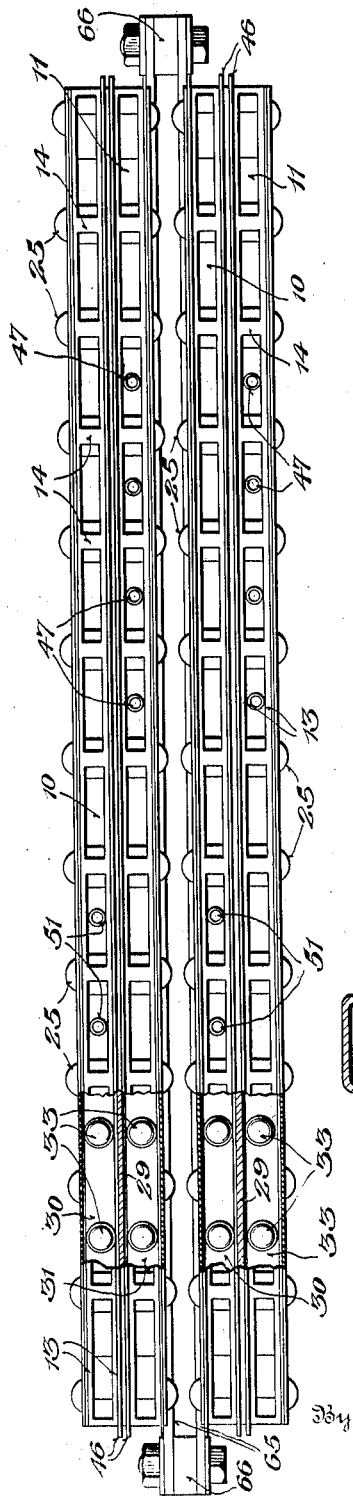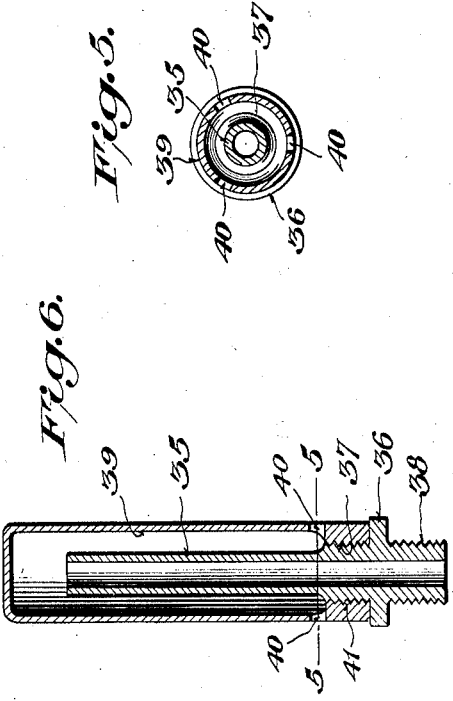

Sept. 8, 1925.
W. G. ALLAN
1,552,812
ELECTROLYTIC CELL
Original Filed Oct. 5, 1920  4 Sheets-Sheet 4
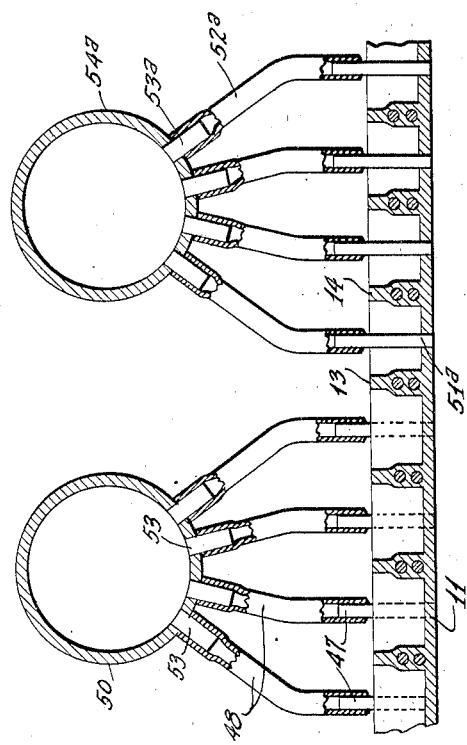
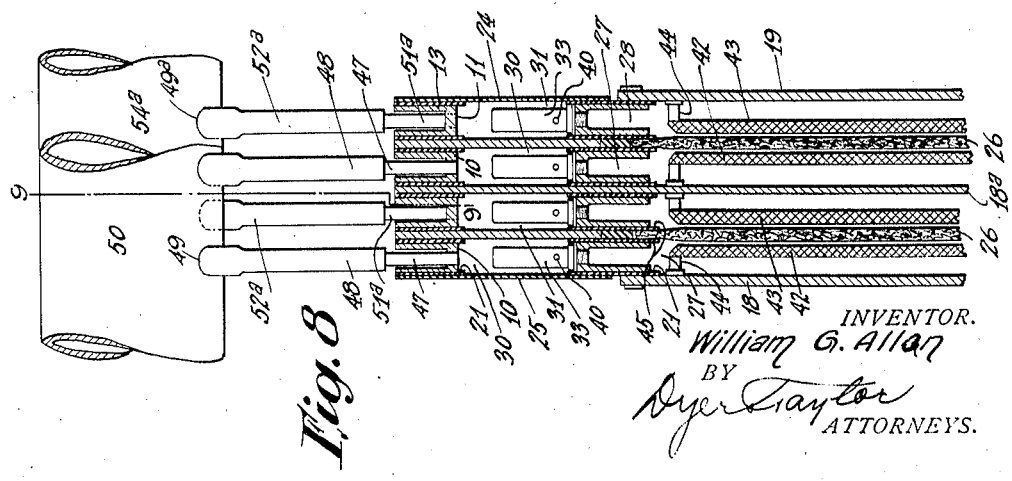
INVENTOR.
William G. Allan
BY
Dyer Taylor
ATTORNEYS.

Patented Sept. 8, 1925.

1,552,812

UNITED STATES PATENT OFFICE.

WILLIAM G. ALLAN, OF TORONTO, ONTARIO, CANADA, ASSIGNOR, BY MESNE ASSIGNMENTS, TO JOHN P. SCOTT, OF TORONTO, CANADA.

ELECTROLYTIC CELL.

Application filed October 5, 1920, Serial No. 414,896. Renewed August 8, 1924.

*To all whom it may concern:*

Be it known that I, WILLIAM G. ALLAN, a subject of the King of Great Britain, residing at Toronto, county of York, Province of Ontario, Canada, have invented certain new and useful Improvements in Electrolytic Cells; and I do hereby declare the following to be a full, clear, and exact description of the invention, such as will enable others skilled in the art to which it appertains to make and use the same.

This invention relates to electrolytic cells; and it has to do more particularly with electrolytic cells adapted for generation of oxygen and hydrogen from an aqueous electrolyte.

A principal object of the invention is the provision of a simple form of cell construction that can be assembled in installations of any desired number of cell units but that does not necessarily require an external conduit system for circulation of the electrolyte through the several electrode compartments, although the employment of a special circulating system, external or otherwise, is in no sense precluded. A further object of the invention is to provide a self-contained cell unit wherein the evolved gases may be efficiently washed and thereby freed of entrained electrolyte, such as caustic alkali, and then separately conducted away from the cell unit, the water employed to wash the gases being then most advantageously employed as "make-up" water to replenish the aqueous electrolyte in the cell and to maintain a predetermined quantity thereof in the cell.

With the above general objects in view, and some others which will be apparent from the description hereinafter, the invention consists in the combination of parts which will be described in connection with the accompanying drawings illustrating a practical embodiment of the invention, and will then be more fully pointed out.

The construction hereinafter described is more particularly adapted to electrolytic cells in which no circulating system common to all the cells is provided. As stated, however, it is not to be understood that the invention is restricted exclusively to cells of this type. In the drawings illustrating a desirable embodiment of the invention in practical form, Fig. 1 is a transverse section through a cell unit, parallel to the diaphragm, on the line 1—1 of Fig. 2;

Fig. 2 is a section at right angles to Fig. 1 on the line 2—2 of Fig. 1;

Fig. 3 is a top plan view showing several cell units connected in series;

Figs. 4, 5, 6 and 7 illustrate details of the filling means and bubbler devices, in section.

Fig. 8 is a detail sectional view illustrating a modification in which the cell unit comprises more than a single cell, and Fig. 9 is a section on the line 9—9 of Fig. 8.

Referring to the drawings which illustrate a construction in which each individual cell constitutes a distinct unit, each cell unit comprises two substantially rectangular frames 10 and 11, which may be of cast iron or cast steel, for example, each peripherally bounding a space which is unequally divided by a transverse horizontal partition or bridge piece 12 integral with the frame, into a bubbler and washer space above said partition, and an electrode space below of much larger size. Each of the said frames is provided with a double peripheral flange 13, the component members of which are connected by transverse webs 14. Similarly each of the bridge pieces 12 is provided with a depending double flange 15 having its component members connected by the transverse webs 16. The described arrangement affords a strong rigid frame construction having plane vertical abutment or bearing faces on said flanges adapted for co-operation with one or more additional frame members of the same type. In a single cell unit of the type herein illustrated, two such frame members are assembled as illustrated in Fig. 2 with their vertical bearing surfaces in registry, and are secured together by any suitable means such as screws 17, provided with insulating bushings 17ª. Where the cell unit is to comprise more than a single cell, a correspondingly greater number of frame members are employed. In such a construction the cells and the gas washing and collecting chambers 30—31 of each cell are separated by a cell plate 18ª carrying an electrode on each side thereof, as shown in Fig. 8. It is to be understood, of course, that there will be a plurality of offtake tubes from each cathode compartment and a plurality of offtake tubes from each anode compartment. The space below the bridge pieces 12 of the cooperating frames 10 and 11 constitutes the cell proper which is provided with end walls 18 and 19, said end walls being secured to the non-adjacent vertical faces of the combined frame structure by any suitable means such as screws 20, and being insulated from the frame by interposed sheet insulation and packing 21. The screws 20 are insulated from said walls by insulating bushings 22. The space above said frames 12 is enclosed by end walls 23, 24, secured to the frame structure by suitable means such as screws 25.

The complete cell space below the bridge pieces 12 is centrally divided by the porous diaphragm 26, of asbestos or the like, into electrode compartments or half-cells 27 and 28, 27 being the anode compartment in this instance and 28 the cathode compartment. The diaphragm may be held in place in any suitable manner, but in the particular construction here illustrated said diaphragm is marginally clamped between the lower portions of the frame members 10, 11, and the bridge pieces 12. The space above the bridge pieces 12 is centrally divided by a partition 29, which may be either of metal or of non-conducting material, into two gas washing and collecting chambers 30, 31, of which 30 is for oxygen and 31 for hydrogen in the present example. Communication between each electrode compartment and the cooperating gas washing and collecting chamber arranged thereabove is afforded by a plurality of small passages 32, extending between the two chambers through the corresponding bridge piece 12, in conjunction with each of which passages is employed a bubbler device 33 of any suitable type that will permit the gas to escape at a predetermined depth below the level 34 of a body of water maintained in the gas washing and collecting chamber. In the present example, each such bubbler device comprises an inner tube 35 provided with a flange or shoulder 36, said tube being threaded above and below said flange as indicated at 37 and 38, respectively. The threaded end 38 of said tube screws into the passage 32 on the upper side of the dividing wall or bridge piece 12; and an inverted bell member 39, provided with escape orifices 40, has its lower portion internally threaded as indicated at 41 to engage threads 37 of tube 35 so that the bell member may be detachably mounted upon said tube and surround the same.

The passages 32 are of circular cross section and the aggregate fluid carrying capacity of said passages is greater than the capacity of the largest single circular conduit that the width of the corresponding compartment will accommodate.

Any suitable type of electrodes may be employed in the compartments 27 and 28. In the present example the anode 42 and cathode 43 are foraminous unipolar electrodes of wire mesh or fabric, and are structurally separate from the cell frames, being supported on the walls 18, 19, respectively, by means of spaced studs 44 which space the electrodes away from the cell walls and hold them substantially in engagement with the interposed diaphragm 26. The division wall 29 separating the upper compartments is clamped between the bearing surfaces of the flanged bridge pieces 12 and the peripheral frame flanges 13, being also separated from the former by packing and insulating material 45, and from the latter by packing and insulating material 46; each sheet of which material may be in one piece and may advantageously project some distance beyond the outer edges of the clamping flanges, thereby providing a creepage surface of exaggerated length which minimizes the possibility of accidental short circuiting of the cell and arcing, due to leakage of electrolyte through the packed joint. The gaskets 46 also pack the joints between the flange faces and the margin of the diaphragm, as shown in Fig. 2, the gasket edges desirably projecting beyond the flanges around the entire periphery of the flanges for the reasons stated.

Each gas washing and collecting chamber is provided with gas offtake means. As the volume of hydrogen generated is twice that of the oxygen, hydrogen offtake means of approximately twice the capacity of the oxygen offtake means are provided in the present specific construction, although the offtake means for both gases might be of equal capacity sufficiently large to accommodate the hydrogen produced. As here shown, the hydrogen offtake means for each hydrogen collecting chamber comprises four offtake pipes 47 leading from the upper part of the chamber and connected by suitable conduit means, such as pieces of rubber hose or tubing 48, to connecting nipples 49 of the hydrogen header pipe 50 leading to a gasometer or other convenient place of storage or use. Similarly the offtake means for the oxygen collecting chamber 30 comprises two tubes 51 leading from the top of the chamber and connected by hose or tubes 52 and nipples 53 to the oxygen header 54 which leads to a gasometer or other place of storage.

As shown in Figs. 8 and 9 the oxygen header 54$^a$ is of the same diameter as the hydrogen header 50, and the number of tubes 52$^a$, and nipples 51$^a$ and 53$^a$ are the same as those leading from the hydrogen side of the washing chamber.

Means are provided for supplying water to the gas washing and collecting chambers; and in the embodiment of the invention illustrated herein, provision is also made for employing the wash water to replenish the supply of electrolyte in the electrode compartments, thus returning to the cells any caustic alkali or other electrolyte washed out of the gases in the washing chamber, and also returning heat units to the cell chambers. In the present instance, a water supply tube 55 having a funnel mouth 56 is mounted on a block 57 of insulating material which is supported in any suitable manner on the outside of the cell frame and is provided internally with a passage 58 from which separate tubes 59 and 60 lead into the upper chambers 30 and 31, respectively, near the bottoms thereof. In each said chamber there is a pipe 61 having its open upper end at a height corresponding to the desired water level in the chamber and extending down through the dividing wall or bridge piece 12 into the electrode chamber below. This pipe extends to near the bottom of the electrode compartment, and most advantageously is then bent upward, terminating in an open end at 62 as shown. Water poured into the funnel 56 passes into both the gas washing and collecting chambers 30 and 31, filling the same to the water level therein shown and then overflowing through pipe 61 and passing down into both electrode compartments below. The described upward bend in pipe 61 in the electrode compartment prevents escape of gas up through the pipe into the washing chamber above.

Hydrogen and oxygen generated in the electrode compartments pass separately through the corresponding set of passages 32 and bubblers 33 into chambers 30 and 31 respectively, the gases being thoroughly washed and at least partially cooled in bubbling through the liquid 34, and going thence to the hydrogen and oxygen headers 50 and 54, respectively. Caustic alkali or other electrolyte removed from the gases by the bubblers returns to the cell compartments with the feed water through pipe 61 as described.

It is to be noted that the arrangement of the gas washing chamber as an integral part of the cell frame enables direct transfer of heat from the electrode chambers to the feed water through the heat conductive bridge members 12, thus ensuring effective pre-heating of the feed water and economical operation.

To provide for conveniently flushing out sludge or sediment with a hose, or for draining the cells, pipe 63, normally closed by valved couplings 64, may enter opposite edges of each electrode compartment at or near the bottom thereof.

Any number of the single cell units described can be connected in series or in parallel to provide a multi-cell generator. As shown in Fig. 3, cells may be connected in series by means of conductive bars or strips 65 fastened in any suitable manner to the adjacent end cell walls and bolted together through an interposed spacing collar 66, for example. Or, the cell units may simply be placed with their electrode plates or walls in direct contact, any member of the cell series being readily removed merely by moving it edgewise.

When the cell units are arranged as just above described, the plate 18 of one unit and the plate 19 of the next adjoining unit will together act in the same manner as does that portion of the plate 18$^a$, Fig. 8, within the cell, and the gas washing and collecting chambers will be defined by the frame members and the plates 23, 24 and 29 as before.

Various modifications in detail are evidently possible within the scope of the invention, which is not limited to the specific structure illustrated.

What I claim is:

1. An electrolytic cell comprising cooperating members enclosing an electrode chamber and a gas washing and collecting chamber thereabove, a diaphragm dividing said electrode chamber into anode and cathode compartments, a partition dividing said gas washing and collecting chamber into oxygen and hydrogen compartments, and conduit means connecting said anode and cathode compartments with said oxygen and hydrogen compartments, respectively, and including a plurality of bubbler devices arranged in each of said oxygen and hydrogen compartments.

2. An electrolytic cell comprising a pair of flat cell members, each closed on one side and divided interiorly by a substantially horizontal apertured transverse partition, means holding said cell members assembled with their open sides adjacent and the horizontal partitions registering, a pervious diaphragm dividing the enclosed space below the registering partitions into two electrode compartments, electrodes in said compartments, an impervious wall dividing the enclosed space above said partition into two upper compartments for washing and collecting gas, each communicating with the cooperating subjacent electrode compartment through said apertured partition, bubbler means in each said upper compartment through which gas coming from the cooperating compartment below must pass, a gas outlet leading from each upper compartment, means for feeding liquid into each upper compartment, and overflow means for conducting excess of liquid from each upper compartment to the electrode compartment below.

3. An electrolytic cell comprising the combination, with flat anode and cathode compartments separated by a diaphragm and of relatively small width transverse to said diaphragm, of separate compartments arranged respectively above said anode and cathode compartments, each of said anode and cathode compartments communicating with the corresponding compartment thereabove by means of a plurality of conduits, a plurality of bubbler devices, one for each conduit, arranged in each of the upper compartments, means for feeding liquid to each of said upper compartments, and means for maintaining a predetermined liquid level in said upper compartments and for conducting excess liquid to said electrode compartments.

4. In electrolytic apparatus, a flat annular cell frame provided with a transverse partition dividing into two parts the space within said frame, said partition being apertured to afford communication between said parts, in combination with bubbler means governing passage of gas through said partition.

5. In electrolytic apparatus, a flat annular cell frame provided with a transverse partition dividing into two parts the space within said frame, said partition being apertured to permit passage of gas therethrough, and liquid overflow means also connecting opposite sides of said partition.

6. In electrolytic apparatus, a flat annular cell frame having parallel flanges extending transversely therefrom, and cross-webs connecting said flanges.

7. In electrolytic apparatus, a flat annular cell frame having parallel flanges extending outwardly therefrom and cross-webs connecting said flanges.

8. In electrolytic apparatus, a flat, annular cell frame having parallel flanges extending outwardly therefrom and cross-webs connecting said flanges, and a partition extending transversely between opposite sides of said frame, said partition also being provided with parallel flanges and connecting cross-webs.

9. An electrolytic cell, comprising enclosing members forming a frame, and a bridge-piece extending between opposite members and separating the area enclosed by the members into an electrode chamber and a washer chamber.

10. An electrolytic cell, comprising enclosing members forming a frame, a transverse bridge piece extending between opposite sides of the frame and dividing the same into an electrode chamber below and a washer chamber above the bridge-piece, means for admitting water to the washer chamber, there being openings in the bridge piece for permitting the escape of gas from the electrode chamber into the washer chamber, and means for preventing the passage of water through said openings.

11. An electrolytic cell, comprising an annular frame member, said frame member being provided with a transverse bridge-piece extending between opposite sides thereof to divide the space enclosed by the frame into an electrode chamber and a washer chamber, means for introducing water into the washer chamber, there being an opening in the bridge-piece, a tube fitted within the opening and extending upward above the bridge-piece and above the level of the water in the washer chamber, a gas bell covering the tube and extending above the top thereof, there being openings in the bell below the water level.

12. An electrolytic cell, comprising a rectangular frame, a bridge-piece extending across the frame from side to side and from end to end thereof to divide the space enclosed by said frame into an electrode chamber below and a feed water and gas washer chamber above, means for introducing water into the feed water and washer chamber, there being gas openings in said bridge-piece, means cooperating with said openings to permit of the passage of gas from the electrode chamber and for preventing the passage of water from the feed water chamber, means for maintaining the water in the feed water chamber at a constant level, means for delivering the overflow to the electrode chamber, the said bridge-piece being of heat conducting material whereby heat from the electrolyte in the electrode chamber will be conducted to the water in the feed water chamber.

13. Electrolytic apparatus comprising, in combination, a plurality of cell frames marginally clamping a plurality of alternately arranged cell wall plates and diaphragms in proper spaced relation to form serially related cells each comprising an anode compartment and a cathode compartment, an anolyte offtake manifold, a catholyte offtake manifold, a plurality of sets of anolyte offtake tubes, each set individually connecting the upper part of an anode compartment to said anolyte manifold, a plurality of sets of catholyte offtake tubes, each set individually connecting the upper part of a cathode compartment to said catholyte manifold, and conduit means for returning electrolyte to the lower part of said anode and cathode compartments.

14. An electrolytic cell comprising cooperating anode and cathode compartments, each provided with a group of cooperating offtakes having an aggregate fluid-carrying capacity exceeding the capacity of the largest single circular conduit that the width of the corresponding compartment would accommodate.

15. Electrolytic apparatus comprising, in combination, a plurality of flat cells, each comprising an anode compartment and a cathode compartment, assembled to provide an apparatus of the character described, manifolds adjacent said cells, groups or sets of tubes connecting the anode compartments individually to one of said manifolds and further groups or sets connecting the cathode compartments to another of said manifolds, the tubes of each group or set entering its manifold radially and in substantially the same plane.

16. In electrolytic apparatus, a manifold comprising a pipe provided with a plurality of groups of nipples, said groups being spaced apart along its length and the nipples of each group being in substantially the same plane.

17. Electrolytic apparatus comprising a plurality of annular metal members and end closure members assembled to provide a substantially liquid tight casing, a plurality of electrodes and diaphragms supported within said casing in alternating arrangement to form cells through which current may be passed in series, and insulation substantially preventing flow of current except through the space within the annular casing members.

18. Electrolytic apparatus comprising a plurality of annular metal cell frames assembled together and insulated from each other, in combination with end closure members, all held tightly together to form a substantially liquid-tight casing, and electrodes supported within said casing but structurally distinct therefrom.

19. An electrolytic apparatus comprising, in combination, a cell having cooperating parallel electrodes of substantial surface extent, an electrolyte circulatory system for said cell comprising a set of offtakes, said set being spaced apart in one direction of the extent of the surfaces of said electrodes, and the offtakes in each set being spaced along said electrode surfaces in a direction transverse to said first direction of spacing.

20. Electrolytic apparatus, comprising a plurality of annular cell frames assembled together, end closure members, means for securing said frame and members together to form a substantially liquid tight box-like casing, and electrodes supported within said casing but structurally distinct therefrom.

In testimony whereof I hereunto affix my signature.

WILLIAM G. ALLAN.